(No Model.) 2 Sheets—Sheet 2.

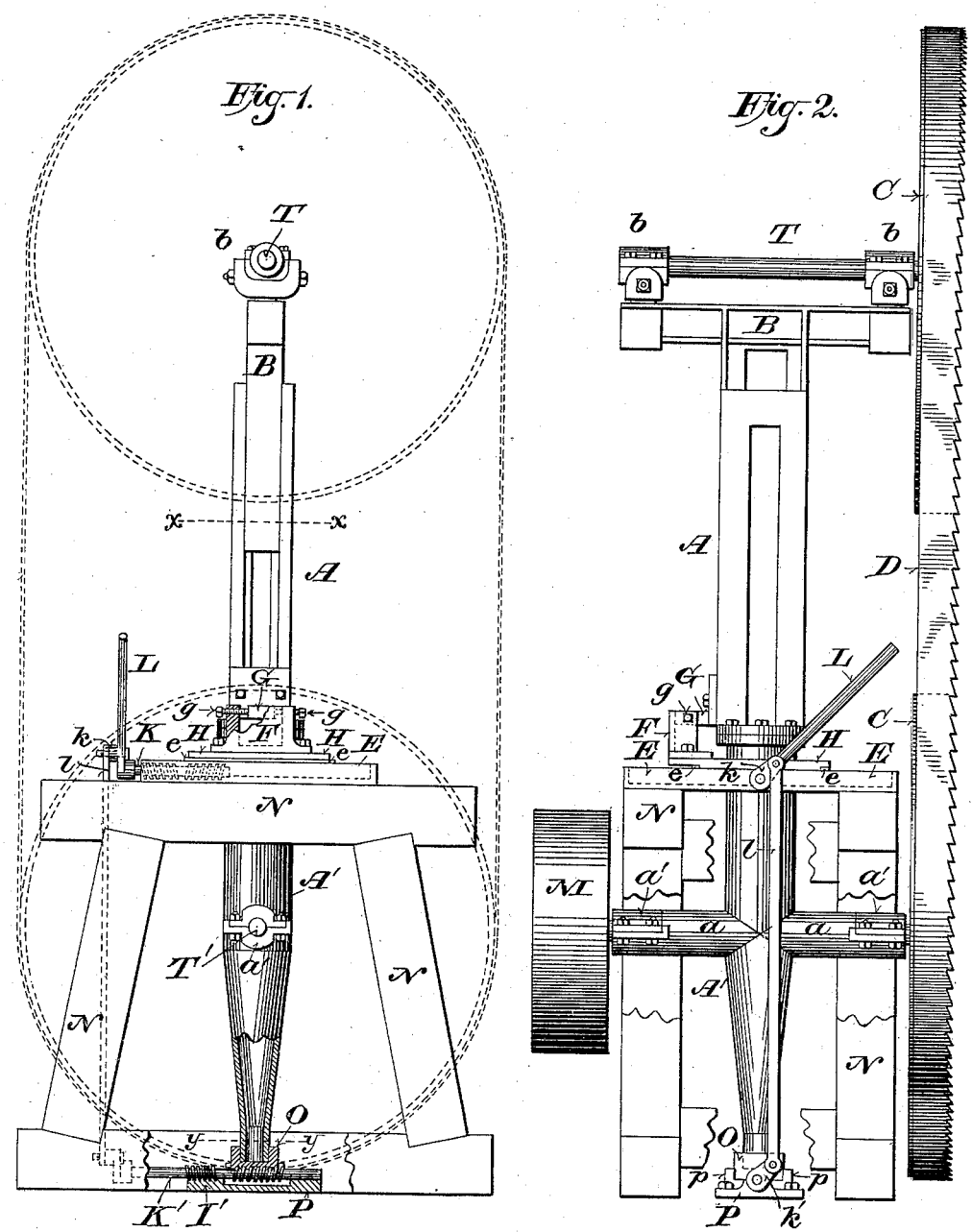

W. GOWEN.
BAND SAW MILL.

No. 383,459. Patented May 29, 1888.

WITNESSES:
Chas. L. Goss.
M. E. Benson.

INVENTOR,
William Gowen,
BY
ATTORNEY.

UNITED STATES PATENT OFFICE.

WILLIAM GOWEN, OF WAUSAU, WISCONSIN.

BAND-SAW MILL.

SPECIFICATION forming part of Letters Patent No. 383,459, dated May 29, 1888.

Application filed January 18, 1887. Serial No. 224,700. (No model.)

*To all whom it may concern:*

Be it known that I, WILLIAM GOWEN, of Wausau, in the county of Marathon and State of Wisconsin, have invented certain new and useful Improvements in Band-Saw Mills; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The objects of my invention are, first, to move the saw and its supporting-wheels bodily away from the log when the carriage is "gigged back;" second, to adjust the "lead" of the saw so as to cause it to work in a true line parallel with the travel of the carriage, and, third, to maintain the saw and its connections in their proper working position when once correctly adjusted.

It consists, essentially, of a supporting-standard, carrying the band wheels and saw and their connections, and supported in bearings movable toward and from the carriage, of mechanism for operating said bearings and moving the saw toward and from the carriage, and of mechanism for turning said supporting-standard about its axis in said bearings, so as to change the lead of the saw.

In the accompanying drawings like letters designate the same parts in the several figures.

Figure 3:
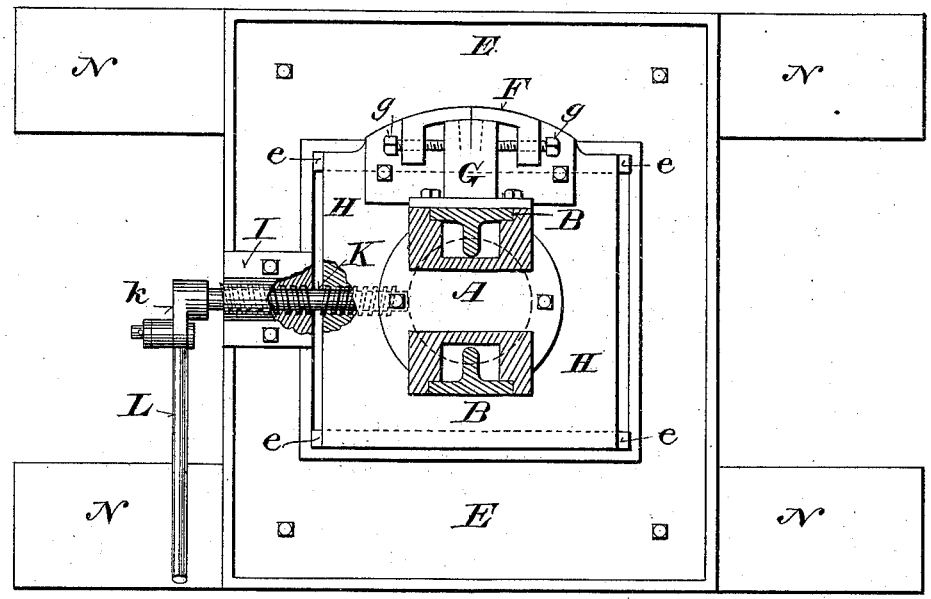
Figure 4:
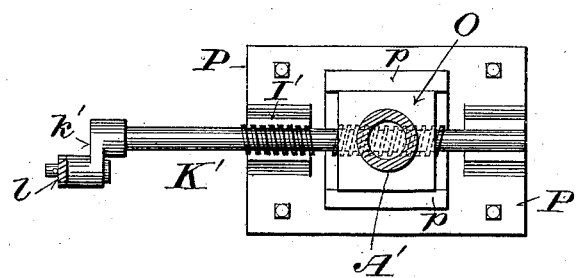

Figure 1 is a front elevation of the supporting-standard and frame of my improved machine, the band wheels and saw being indicated by dotted lines. Fig. 2 is a side elevation of the machine. Fig. 3 is a horizontal cross-section, on an enlarged scale, on the line *x x*, Fig. 1; and Fig. 4 is a like section taken on the line *y y*, Fig. 1.

It is essential to the successful operation of the band-saw that contact between it and the log should be avoided in "gigging," and that when the band-wheels and guides have once been correctly adjusted to cause the saw to run in a true plane they should not be disturbed to change the lead of the saw. To attain these ends is the design of the following described machine.

A A' represent a central supporting-standard, preferably formed in sections, with coupling-flanges which are bolted together, as shown most clearly in Fig. 2. The lower section, A', of said standard is preferably made cruciform, its horizontal limb *a* being furnished with boxes *a' a'*, in which is supported the lower band-wheel shaft, T'. The upper section, A, of said standard is formed with a central vertical slot for the reception and adjustment of the upper guide, (not shown,) and on opposite sides with grooved ways for the vertically-adjustable T-frame B, which is provided with boxes *b b*, supporting the upper band-wheel shaft, T. The lower section, A', of said supporting-standard bears at its lower reduced end in a step, O, adapted to slide horizontally parallel with the plane of the band-wheels in ways *p p*, formed therefor on the bed-plate P, as shown most clearly in Figs. 2 and 4. At or near its upper end said section A' bears in a box, H, adjustable horizontally and parallel with the step O on ways *e e*, formed therefor on the bed-plate E, which is permanently secured to suitable frame-work, N N.

K K are screw-shafts, preferably formed with right and left threads working, respectively, with nuts I I', formed in or secured to the bed-plates E and P, and with similar nuts formed in or secured to box H and step O. The step O, preferably guided by its vertical edges only and free to move vertically in the bed-plate P, is formed on its lower side with a half-nut, which rests upon and is supported by the screw-shaft K', engaging at one side thereof with and supported by a similar half-nut, I', formed in said bed-plate. Upon the outer end of the crank-shafts K K' are formed or secured cranks *k k'*, which are connected by the rod *l*. The upper crank, *k*, may be extended to form a lever, L, by means of which the screw-shafts K K' can be operated, or, if preferred, an engine or other suitable means may be connected with either of said cranks to operate said screws.

To the back side of section A of the supporting-standard is secured an arm, G, working in an arc-shaped flange, F, formed upon or secured to the box H, as shown in Figs. 1, 2, and 3. Said arm G is adjusted and held in any desired position by bolts *g g*, working in nuts formed on said flange F upon opposite sides of said arm.

C C are the band-wheels, secured to adjacent ends of the shafts T T' and supporting the saw in the usual manner. Upon the opposite end of the lower band-wheel shaft, T', is mounted the driving-pulley M.

My improved machine operates as follows: The band-wheels and guides, all carried by the standard A A', are carefully adjusted when the machine is set up, so as to cause the working side of the saw to run in a true plane tangent to the faces of the band-wheels, and when so adjusted they should not be disturbed afterward, except, perhaps, to trim the upper band-wheel by raising or lowering the rear end of its shaft T, so as to cause the saw to run properly upon said band-wheels. The lead of the saw is then changed, as required, to cause it to work in a true line parallel with the travel of the carriage by swinging the standard A A', with the band wheels and saw supported thereon, about the axis of said standard by means of the adjusting-bolts $g\ g$. It will be observed that the lead of the saw is thus changed without disturbing the adjustment or relative position of the band wheels and saw and their connections. When the saw has finished its cut and the movement of the carriage is reversed, the cranks $k\ k'$ are turned to the left, as seen in Fig. 2, by the lever L or other suitable means under the control of the operator, and the screws K K' shift the box H and the step O in a right line away from the carriage or the track upon which it travels, thus carrying the saw out of contact with the log in gigging without disturbing the lead of said saw or the relative adjustment of the band-wheels, guides, and their connections supported upon said standard.

It is obvious that various changes may be made in the details of construction without departure from the spirit of my invention.

I claim—

1. The combination, in a band-saw mill, with the upper and lower band-wheels and their shafts, the band-saw, and their connections, of an upright supporting-standard carrying the same, provided with bearings for the upper and lower band-wheel shafts, and movable with said band wheels and saw and their connections transversely to the carriage-track, substantially as and for the purposes set forth.

2. The combination, in a band-saw mill, with the band wheels and saw, of a standard carrying the same and supported in bearings adjustable transversely to the carriage-track and arranged to be turned about its axis in said bearings, so as to change the lead of the saw, substantially as and for the purposes set forth.

3. The combination, in a band-saw mill, with the band wheels and saw, of a supporting column or standard provided with bearings for the upper and lower band-wheel shafts and movable laterally in ways transverse to the carriage-track, and screws working therewith to move said column or standard and the parts supported thereon toward and from said carriage-track, substantially as and for the purposes set forth.

4. The combination, in a band-saw mill, with the band wheels and saw, of a standard carrying the same and supported and arranged to be turned in bearings adjustable transversely to the carriage-track, screws working with said bearings, and mechanism for operating the same, whereby the saw is carried out of contact with the log in gigging, substantially as and for the purposes set forth.

5. The combination, in a band-saw mill, with the band wheels and saw, of an upright column or standard provided with bearings for the upper and lower band-wheel shafts and supported in slides movable in ways transverse to the carriage-track, crank-shafts working with said slides, and a lever connected with said crank-shafts and arranged to operate said screws and to move the saw toward and from the carriage-track, substantially as and for the purposes set forth.

6. The combination, in a band-saw mill, with the band wheels and saw, of a column or standard provided with bearings for the upper and lower band-wheel shafts and supported and arranged to turn about an upright axis in suitable bearings provided therefor, an arm projecting laterally from said standard, and adjusting-screws working in fixed nuts against the opposite sides of said arm and arranged to turn said standard upon its axis and to lock the same at any desired angle, substantially as and for the purposes set forth.

7. The combination, in a band-saw mill, with the band wheels and saw, of an upright column or standard capable of angular movement about its axis, a vertically-adjustable frame mounted upon said standard and provided with bearings for the upper band-wheel shaft, slides supporting said standard and movable transversely to the carriage track, and mechanism for moving said slides toward and from said track, substantially as and for the purposes set forth.

In testimony that I claim the foregoing as my own I affix my signature in presence of two witnesses.

WILLIAM GOWEN.

Witnesses:
 CHAS. L. GOSS,
 GEORGE M. GOLL.